J. S. GAGE.
Seed-Drill Attachment.

No. 36,291.  Patented Aug. 26, 1862.

Witnesses:
Reubn Hunt
P. B. Gage

Inventor:
John S. Gage

UNITED STATES PATENT OFFICE.

JOHN S. GAGE, OF DOWAGIAC, MICHIGAN.

IMPROVEMENT IN SEED-COVERERS FOR GRAIN-DRILLS.

Specification forming part of Letters Patent No. 36,291, dated August 26, 1862.

*To all whom it may concern:*

Be it known that I, JOHN S. GAGE, of Dowagiac, in the county of Cass, State of Michigan, have invented a new and Improved Seed-Coverer for Seeding-Machines; and I do hereby declare that the following is a full, clear, and exact description of the same, reference being had to the accompanying drawings, making a part of this specification, in which—

Figure 3:
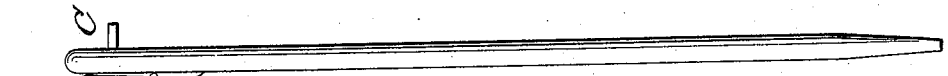
Figure 2:
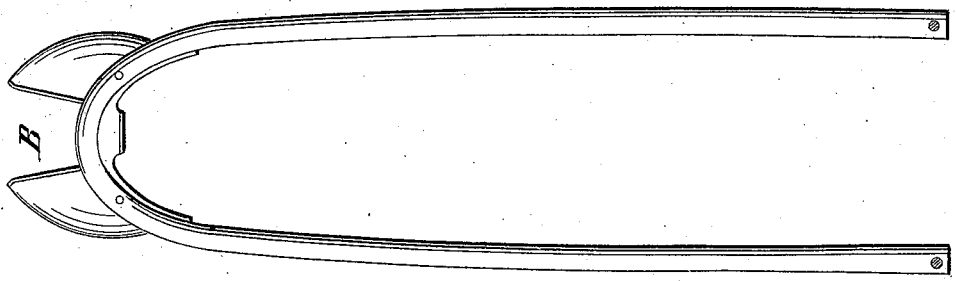
Figure 1:
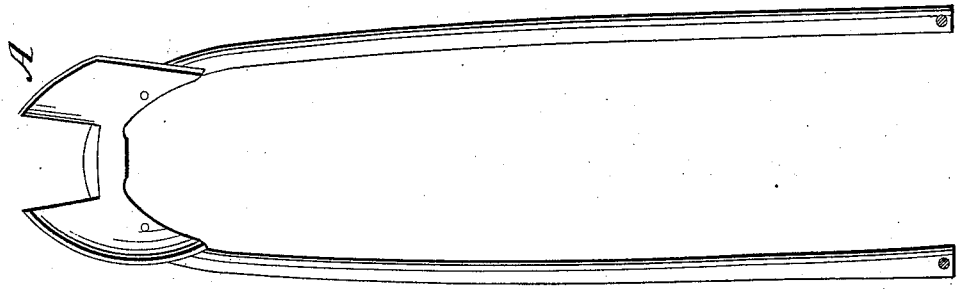

Figure 1 is a top view of my invention. Fig. 2 is a bottom view of the same, and Fig. 3 is a side view of the same.

Similar letters of reference indicate corresponding parts in the three figures.

This invention is designed to be an improvement on the machine for which Letters Patent No. 29,071 were granted to John S. Gage, and also improvement on the machine for which Letters Patent No. 34,955 were granted to John S. Gage and P. D. Beckwith; and it consists in a novel form of the coverer, whereby the earth, when wet or adhesive, is entirely prevented from adhering to their lower surfaces, thus enabling them to do good work where it would otherwise be impossible, and at the same time a great saving thereby effected in the power required to draw the machine; secondly, where the earth is compact and hard weights may be placed on the coverers, causing them to enter deeper into the compact surface, thereby covering the seed much better than they otherwise could.

To enable others skilled in the art fully to understand and construct my invention, I will proceed to describe it.

A represents a coverer divided into two equal parts where it comes in contact with the earth and for a few inches above, and each part placed at a slight angle with the line of draft.

B represents an open space between the two parts of the coverer from two to three inches in width, through which the wet soil will readily pass, instead of being carried forward with the coverer.

C represents a slight projection of the coverer on its upper edge, on which weights may be placed and held when it is desired to have the coverer heavier to do perfect work.

The operation is as follows: As the machine moves forward the soil will be drawn by the coverers from their extreme edges toward their center or open space, where it will pass out, thus entirely preventing it from sticking to the coverer.

The above-described coverer is simple in its construction and very efficient, and leaves the soil in a good state for the growth of the plant.

I do not claim any of the above-described parts separately or in themselves considered; but,

Having thus described my invention, what I do claim as new, and desire to secure by Letters Patent, is—

The coverers A, open space B, and projection C, when combined and arranged to operate in the manner and for the purpose set forth.

JOHN S. GAGE.

Witnesses:
WM. H. GAGE,
A. I. GAGE.